Sept. 9, 1941. J. E. DEVLIN 2,255,350

CROSS CHAIN FOR AUTOMOBILE TIRES

Filed Dec. 29, 1939

Inventor:
James E. Devlin
By Charles A. Warren
Attorney

Patented Sept. 9, 1941

2,255,350

UNITED STATES PATENT OFFICE 2,255,350

CROSS CHAIN FOR AUTOMOBILE TIRES

James E. Devlin, Worcester, Mass.

Application December 29, 1939, Serial No. 311,613

5 Claims. (Cl. 152—233)

The present invention relates to a cross chain for automobile tires and particularly to a means for attaching a chain at opposite ends to the rim of a wheel on which the tire is mounted. In certain aspects the present invention is an improvement over the structure shown in an earlier Devlin application, Serial No. 238,628, filed November 3, 1938.

The recent development and almost universal use of pressed steel wheels, as well as the recent design of fenders, has made it practically impossible to use the conventional "mud-hooks" which require the insertion between adjacent spokes of the wheel. The alternative to mud hooks has been complete sets of chains, but their use for emergency purpose is practically impossible with the new design of automobiles, where so much of the tire is nearly concealed by the fender.

The principal purpose of the present invention is the development of a means for holding short cross chains in place on a tire with the cross chain easily removable, regardless of the position of the automobile wheel. The invention contemplates a device which is universally applicable to all dimensions of automotive wheels so that it is unnecessary to manufacture a large number of different sizes. Other and further objects and advantages of the invention will more fully appear from the following detailed description, taken in connection with the accompanying drawing, in which—

Figure 7:
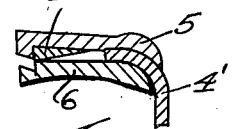
Figure 4:
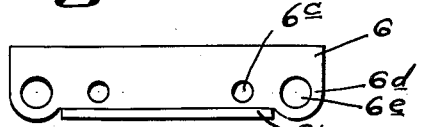
Fig. 4 is a plan view of the part shown in Fig. 2.
Figure 6:
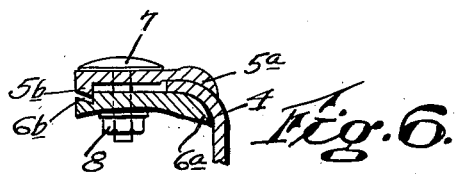
Fig. 6 is a sectional view through the clamp showing its application to the rim of the wheel.
Figure 5:
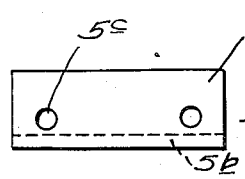
Fig. 5 is a plan view of the part shown in Fig. 3.

Fig. 7 corresponds to Fig. 6, showing the clamp attached to a thicker wheel rim.

Figure 8:
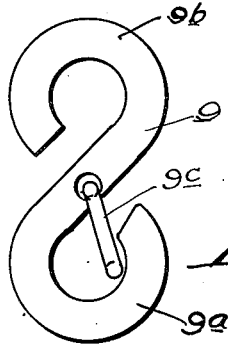

Fig. 8 is a modified form of hook for the end of the cross chain.

Figure 9:
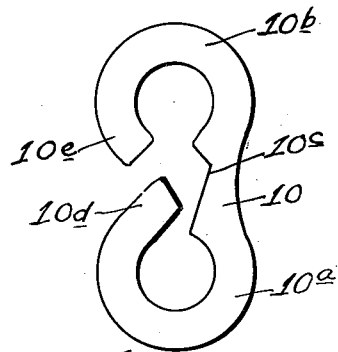

Fig. 9 is a further modification of the hook.

Figure 1:
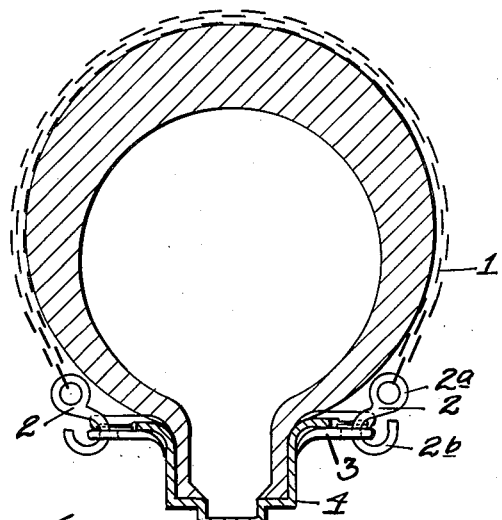
Fig. 1 is a sectional view through a tire and rim, showing a cross chain embodying the invention mounted thereon.

With reference first to Fig. 1, the cross chain 1, which is of any suitable chain structure of the type useful for automobile wheels has a hook 2 at each end thereof by which the ends of the chain are releasably secured to clips or clamps 3 positively mounted on opposite edges of the wheel rim 4. Although these clamps are intended to be removed from the rim during the portions of the year when cross chains are unnecessary, they are securely mounted on the rim and remain thereon even though the chains themselves are removed. The releasable hooks 2 provide for attachment or removal of the chain, as will be apparent.

As best shown in Figs. 2 to 5, the clamps are each made up of an inner member 5 and an outer member 6 which are held together by a pair of bolts 7 extending therethrough. Each of the members is arcuate, as shown, to approximate the curvature of the rim to which it is applied.

The inner member 5 has its inner edge curved at 5a to fit the curvature of the rim adjacent the outer edge and this portion of the member is also tapered to a comparatively thin edge so that it will not interfere with the proper position of the tire on the rim. Adjacent the outer edge of this member is a projecting tongue 5b extending the length of the member, and, as will be apparent, this same member has spaced openings 5c through which the bolts 7 extend.

Figure 2:
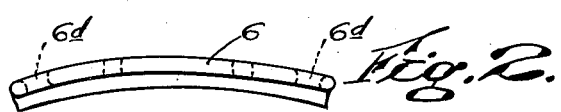
Fig. 2 is a side view of one of the parts of the clamp.
Figure 3:
Fig. 3 is a side view of the other part of the clamp.

The outer member 6, which is longer than the inner member, has its inner edge tapered at 6a and is also slightly curved to form to the contour of the outer surface of the rim. Adjacent the outer edge of this member is a groove 6b extending the length thereof to receive the projecting tongue 5b of the inner member. Openings 6a in this member receive the bolts 7 which hold the members together. The members 6 has lugs 6d at the end thereof with openings 6e therethrough to receive the hooks 2. The clamps are applied as shown in Fig. 6 with the inner edge 5a of the member 5 extending over the inner side of the rim between the tire and rim. It has been found that by providing a slight longitudinal curvature for each of the members 5 and 6, as shown in Figs. 2 and 3, that these members may be attached to varying sizes of rim without a change in curvature, since the bolts, when the nuts 8 thereon have been tightened, will spring the members 5 and 6 enough to assure a secure engagement between the members and rim over the entire length of the members.

It is essential that the cross chain be readily attached to the clamps in order that the device may be of greatest value. Accordingly, as shown in Fig. 1, the hooks 2 comprise a closed eye 2a secured to the end of the cross chain and an open eye 2b engageable through the opening 6e. For application of these hooks in attaching the cross chain the end of the open loop 2b is started through the opening 6e from the tire side thereof, as shown, so that the hooks when fully applied will be in the position shown in Fig. 1. It will be understood that the chain will be slightly loose on the tire and it will therefore be possible for the chain to twist to some extent for uniform wear on all sides thereof. Nevertheless, the chain, once hooked, will not be disengaged during use, since, at no time, either with the vehicle wheel rotating or at rest, will the cross chain be in such a position that the hook would swing itself into a position to be disengaged from the clamp. Obviously, in attaching the cross chains, the hook is first engaged with the clamp on the inside of the rim and the opposite hook is subsequently engaged with the outside clamp.

An alternative form of hook is shown in Fig. 8 and this hook 9 has an open loop 9a engageable with the end link of the cross chain. This loop is releasably closed by a swinging latch 9c pivoted to the central portion of the hook, as shown, and adapted to extend across the opening into the loop. This hook also has an open loop 9b at the other end corresponding to the open end 2b above described.

A further modified form of loop 10, as shown in Fig. 9, has an open loop 10a to receive the end link of the chain and at the opposite end an open loop 10b engageable with the clamp. The central portion of the loop has a notch 10c into which the free end 10d at the end of the loop 10a projects to such an extent as substantially to close the loop 10a, allowing only width enough for the link of the cross chain to pass therethrough. The opposite free end 10e of the hook provides a wider opening into the loop 10b, as shown, so that there is sufficient room for the hook to be positioned on the clamp.

In accommodating the clamp to rims of buses or trucks which are considerably thicker than those of lighter vehicles, a wedge 11 may be positioned between the members 5 and 6, as shown in Fig. 7, in this way assuring a greater surface engagement between the members 5 and 6 and the edge of the rim 4' on which the clamp is positioned. This clamp is attached by bolts corresponding to the bolts 7 of Fig. 6.

I claim,

1. A clamp for attachment to a wheel rim comprising a pair of members, each of which has its inner edge curved to conform to the curvature adjacent the edge of the rim, said members having interengaging elements thereon to hold said members against relative movement, bolts passing through said members for urging the members toward each other, thereby clamping the inner edges of the members against the opposite sides of the edge of the wheel rim, and one of said members having means thereon for attachment of the opposite ends of a cross chain thereto.

2. A clamp for attachment to a wheel rim comprising a pair of members, each of which has its inner edge curved to conform to the curvature adjacent the edge of the rim, said members having interengaging elements thereon to hold said members against relative movement, bolts passing through said members for urging the members toward each other, thereby clamping the inner edges of the members against the opposite sides of the edge of the wheel rim, and one of said members having lugs at opposite ends thereof with openings therethrough to receive the opposite ends of a cross chain.

3. A clamp for attachment to substantially all sizes of automotive wheel rims, comprising separate inner and outer members, each of which is arcuate longitudinally substantially to conform to the average curvature of the wheel rim, each member having its inner edge arcuate laterally to conform substantially to the crosswise curvature of the edge of the wheel rim, spaced clamping bolts passing through said members for urging them together to clamp between their inner edges the edge of the wheel rim, one of said members having attaching means thereon to which the ends of a cross chain may be releasably secured.

4. A clamp for attachment to substantially all sizes of automotive wheel rims, comprising separate inner and outer members, each of which is arcuate longitudinally substantially to conform to the average curvature of the wheel rim, each member having its inner edge arcuate laterally to conform substantially to the crosswise curvature of the edge of the wheel rim, spaced clamping bolts passing through said members for urging them together to clamp between their inner edges the edge of the wheel rim, one of said members having a projecting tongue and the other of said members having a groove to receive said tongue for holding said members against relative movement, one of said members having means thereon to which a cross chain may be releasably secured.

5. A clamp for attachment to substantially all sizes of automotive wheel rims, comprising separate inner and outer members, each of which is arcuate longitudinally substantially to conform to the average curvature of the wheel rim, each member having its inner edge arcuate laterally to conform substantially to the crosswise curvature of the edge of the wheel rim, spaced clamping bolts passing through said members for urging them together to clamp between their inner edges the edge of the wheel rim, one of said members having a projecting tongue and the other of said members having a groove to receive said tongue for holding said members against relative movement, one of said members having projecting lugs at the ends thereof with openings therethrough to receive the opposite ends of a cross chain.

JAMES E. DEVLIN.